United States Patent
Jones et al.

(10) Patent No.: US 6,170,875 B1
(45) Date of Patent: Jan. 9, 2001

(54) WHEEL SUSPENSION ATTACHMENT ASSEMBLY

(76) Inventors: Robert Allen Jones, 6763 Devonshire Cir., Canton, MI (US) 48187; Dave Watts, 16112 Middlebury Dr., Dearborn, MI (US) 48120

(*) Notice: Under 35 U.S.C. 154(b), the term of this patent shall be extended for 0 days.

(21) Appl. No.: 09/345,353

(22) Filed: Jul. 1, 1999

(51) Int. Cl.[7] ....................................... B62D 7/99
(52) U.S. Cl. .................. 280/788; 280/796; 280/124.134
(58) Field of Search ............................ 280/124.134, 788, 280/796, 795

(56) References Cited

U.S. PATENT DOCUMENTS

| | | | |
|---|---|---|---|
| 657,430 | * | 9/1900 | Maxim ................................. 280/796 |
| 2,009,963 | * | 7/1935 | Matthaei ............................. 280/796 |
| 2,192,560 | * | 3/1940 | Riemenschneider ................ 280/796 |
| 2,311,419 | * | 2/1943 | Ulrich ................................. 280/788 |
| 2,757,016 | | 7/1956 | Adloff et al. . |
| 2,972,498 | | 2/1961 | Kelley . |
| 3,026,124 | | 3/1962 | Eyb . |
| 3,243,007 | | 3/1966 | Berckhan . |
| 5,114,183 | * | 5/1992 | Haluda et al. ...................... 280/788 |
| 5,611,569 | | 3/1997 | Sekiguchi et al. . |
| 5,641,181 | | 6/1997 | Galhotra . |

* cited by examiner

Primary Examiner—Kenneth R. Rice
(74) Attorney, Agent, or Firm—Ford Global Technologies, Inc.

(57) ABSTRACT

A wheel suspension attachment assembly for use in combination with a vehicle having several cooperating structural frame members 28, 30 and including several members 20–26 which selectively, respectively, and movably perforate and protrude from the members 28, 30 and which selectively and movably receive a unique one of the control arms 48, 49 of one of several wheel assemblies 50–56 and which cooperatively and stiffly attach the several wheel assemblies 50–56 to the structural frame members 28,30.

8 Claims, 4 Drawing Sheets

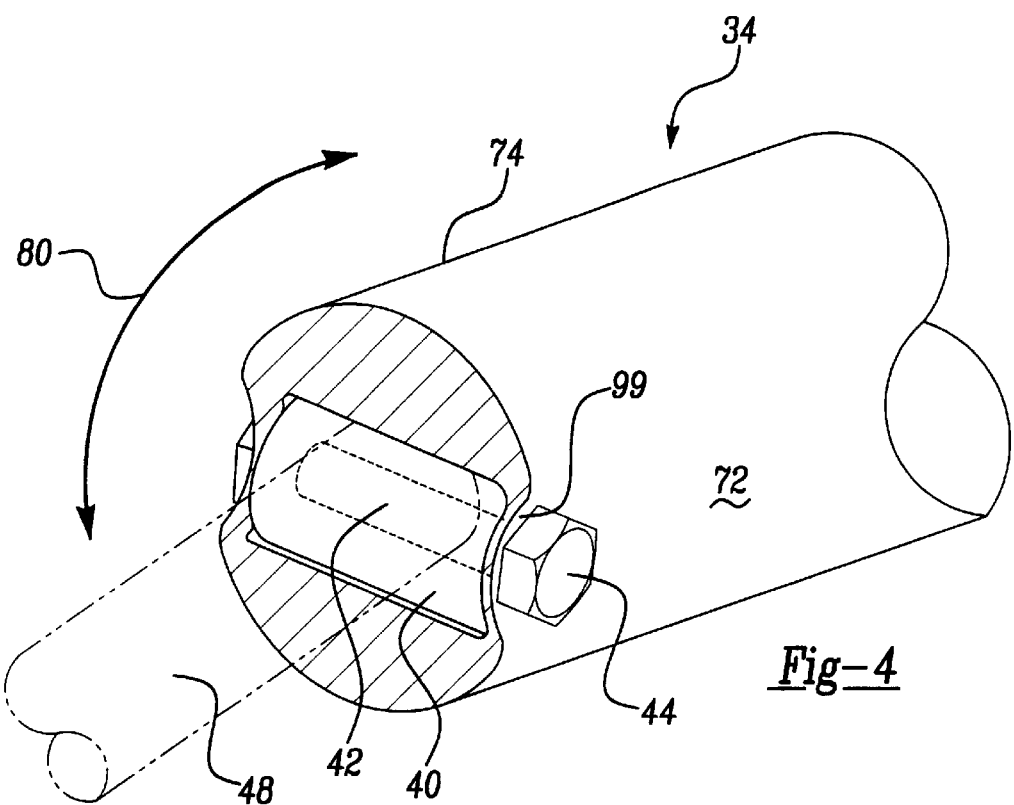
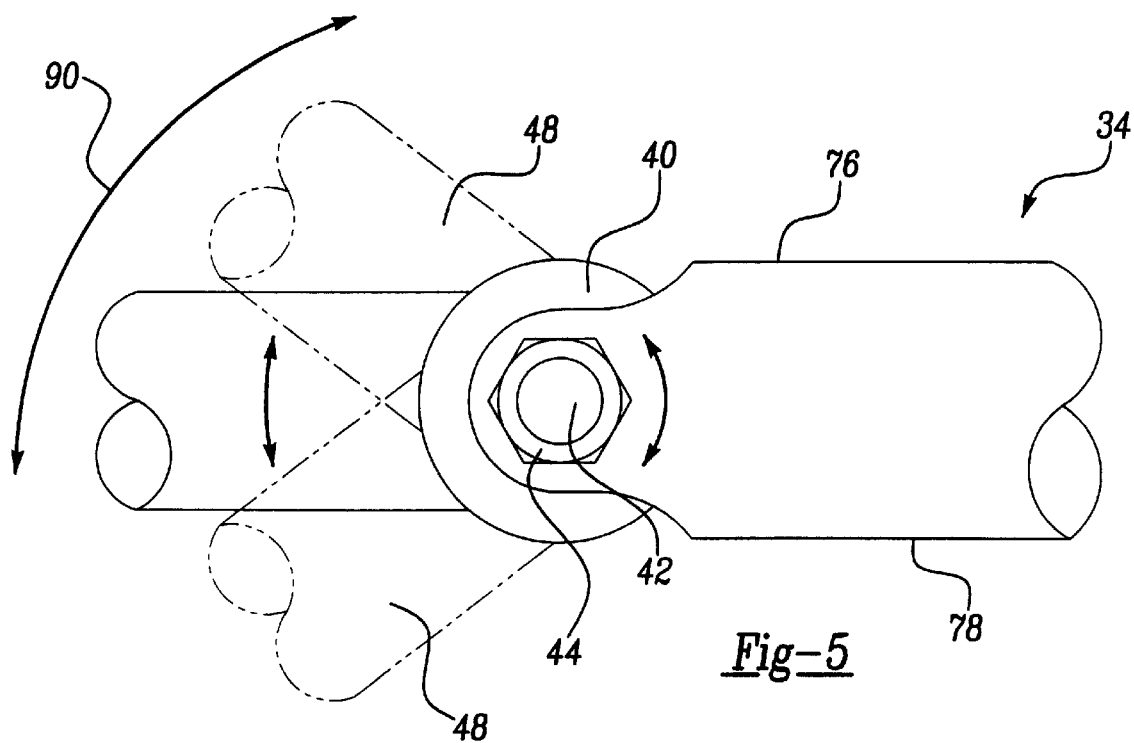

WHEEL SUSPENSION ATTACHMENT ASSEMBLY

FIELD OF THE INVENTION

This invention relates to a wheel suspension attachment assembly and more particularly, to a wheel suspension attachment assembly which may be used by and/or integrally formed within a vehicle frame or sub-frame and which is effective to stiffly, selectively, and movably attach wheel suspension assemblies to the vehicle frame or sub-frame.

BACKGROUND OF THE INVENTION

A vehicle typically includes a frame, or several sub-frames and/or structural members which are selectively and cooperatively connected to form a frame, to which several wheel suspension assemblies are movably attached. Particularly, the frame receives and deformably absorbs the various forces created by the moving wheels and wheel suspension assemblies.

Oftentimes, especially when the vehicle is driven at relatively high speeds and is forced to make relatively tight turns, substantially large wheel assembly generated forces are received by the frame and cause the frame to undesirably and substantially deform, thereby making the vehicle relatively difficult to control or "handle" and creating discomfort within the passenger compartment, oftentimes referred to as a "rough ride".

It is therefore desirable to have the wheel suspension assemblies be stiffly and/or rigidly attached to the vehicle frame and to have these assemblies substantially maintain their desired stiff attachment even during these relatively high speed and tight turning conditions, thereby allowing the relatively large wheel assembly forces to be absorbed without substantially and undesirably deforming the frame. Current wheel suspension attachment assemblies do not provide such a desired and stiff/rigid wheel suspension attachment.

SUMMARY OF THE INVENTION

It is a first object of this invention to provide a wheel suspension attachment assembly which overcomes at least some of the previously delineated drawbacks associated with prior attachment assemblies and which selectively and stiffly attaches at least a portion of at least one of the wheel suspension assemblies to the vehicle frame.

It is a second object of the invention to provide a wheel suspension attachment assembly which selectively and stiffly attaches at least a portion of at least one of the wheel suspension assemblies to at least one vehicle sub-frame.

According to a first aspect of the present invention, an attachment assembly is provided for use in combination with a vehicle having at least one wheel assembly and at least one structural frame member. The attachment assembly includes a member having a hollow end portion which perforates and protrudes from the at least one structural frame member and which contains a portion of the at least one wheel assembly, and a movable member which movably resides within at least a portion of the protruding hollow end portion and which is attached to the contained portion of the at least one wheel assembly, thereby cooperating with the member to rigidly and stiffly attach the at least one wheel assembly to the at least one structural frame member.

Further objects, features, and advantages of the invention will become apparent from a reading of the following detailed description in combination with the referenced drawings.

BRIEF DESCRIPTION OF THE DRAWINGS

FIG. 4 is a perspective fragmented view of an end portion of one of the wheel suspension attachment assemblies shown in FIG. 1 and made in accordance with the teachings of a second embodiment of the invention;

FIG. 5 is a perspective fragmented view of an end portion of one of the wheel suspension attachment assemblies shown in FIG. 1 and made in accordance with the teachings of a third embodiment of the invention.

DETAILED DESCRIPTION OF THE PREFERRED EMBODIMENT

Figure 3:
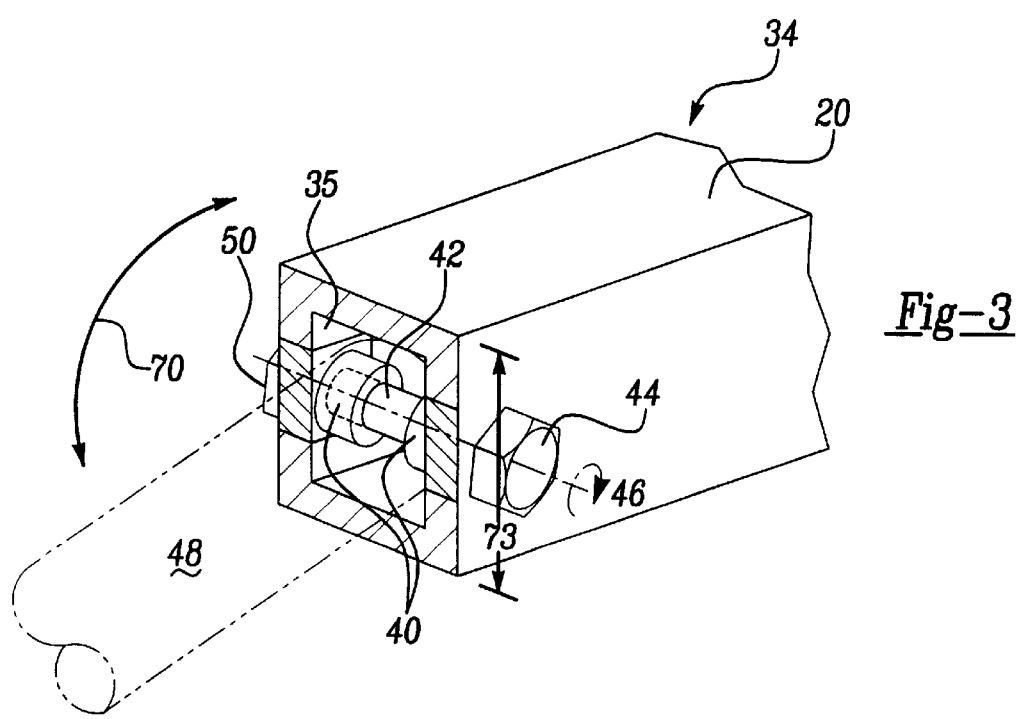
FIG. 3 is a perspective fragmented view of an end portion of one of the wheel suspension attachment assemblies shown in FIG. 1.
Figure 6:
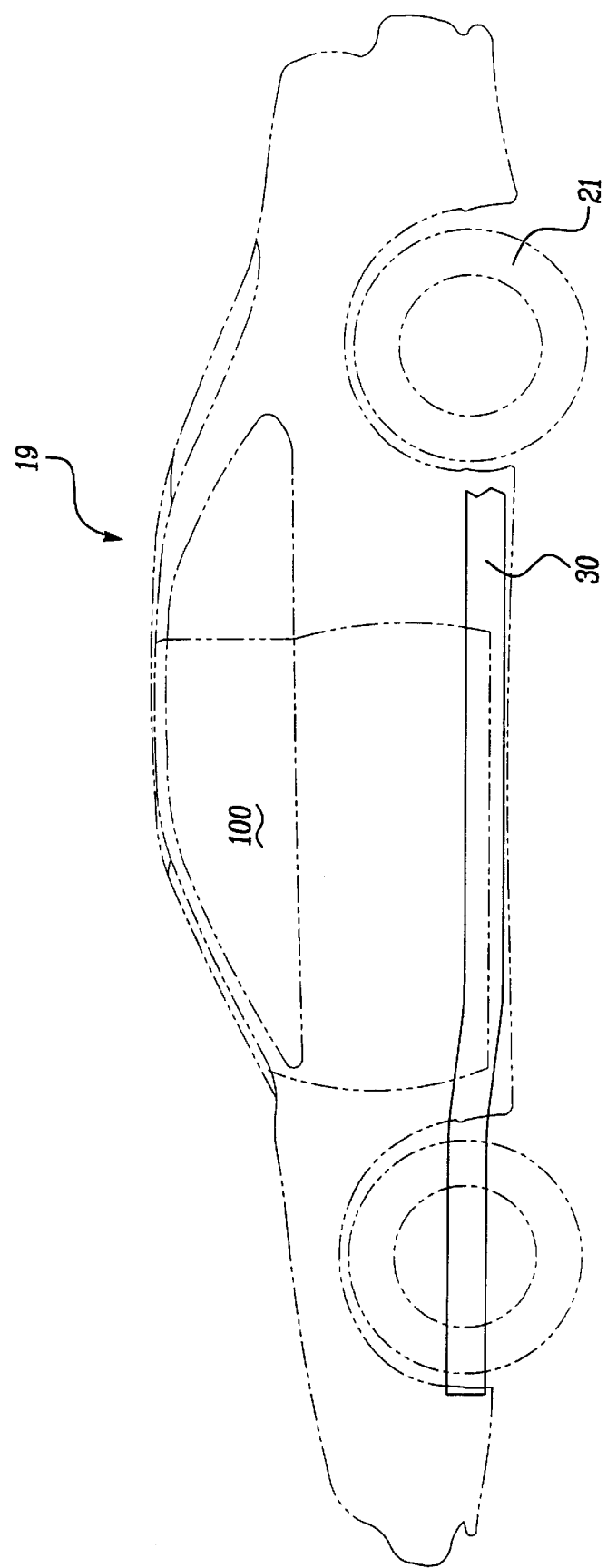
FIG. 6 is a fragmented side view of a vehicle incorporating at least one wheel suspension attachment assembly made in accordance with the teachings of one of the embodiments of the invention.

Referring now to FIGS. 1–3 and 6, there is shown a vehicle frame assembly 10 including several wheel suspension attachment assemblies 12, 14, 16, and 18, which are made in accordance with the teachings of the preferred embodiment of the invention. Assembly 10 selectively supports various vehicle components and/or systems, such as an engine or differential, thereby allowing for the selective formation of a vehicle 19, and selectively and deformably receives the forces generated by the moving tires 21 and associated wheel suspension assemblies 50–56. Each assembly 12–18 includes a respective and generally elongated member 20, 22, 24, and 26 having, in one non-limiting embodiment, a generally rectangular or square cross-sectional area as is best shown in FIG. 3.

Frame assembly 10 further includes two substantially similar and generally elongated structural frame members 28, 30 which are substantially, longitudinally, and mutually co-extensively disposed along the vehicle 19. Each member 20–26 is generally and laterally disposed across the structural frame members 28,30 and the vehicle 19, and has, in one non-limiting embodiment, respective, opposed, and substantially identical hollow ends 32, 34.

Each end 32 of each member 20–26 selectively perforates and/or penetrates and protrudes/projects from the member 28 while each end 34 of each member 20–26 selectively perforates and/or penetrates and protrudes/projects from the member 30. In one non-limiting embodiment, each member 20–26 perpendicularly perforates and protrudes/projects from the members 28, 30 (e.g., each end 32,34 of each member 20–26 forms a substantial right angle 29 with respect to one of the members 28, 30). In yet another non-limiting embodiment of the invention, each of the members 20–26 and each of the wheel assemblies 50–56 are substantially and respectively similar or identical. In yet another non-limiting embodiment of the invention, members 20–26 are substantially hollow. In another embodiment of the invention, assemblies 50–56 are dissimilar. Further, in yet another embodiment, ends 32, 34 of members 22–26 are each substantially identical while ends 32, 34 of member 20 include a retaining "dimpled" or indented portion which will be explained. Hence, this invention provides substantially the same advantages to a wide variety of dissimilar wheel suspension assemblies 50–56 and allows ends 32, 34 of members 20–26 to be structurally configured to conform to variations in the structure and shape of members 28, 30 and assemblies 50–56 while providing a desired stiff wheel suspension attachment.

Figure 1:
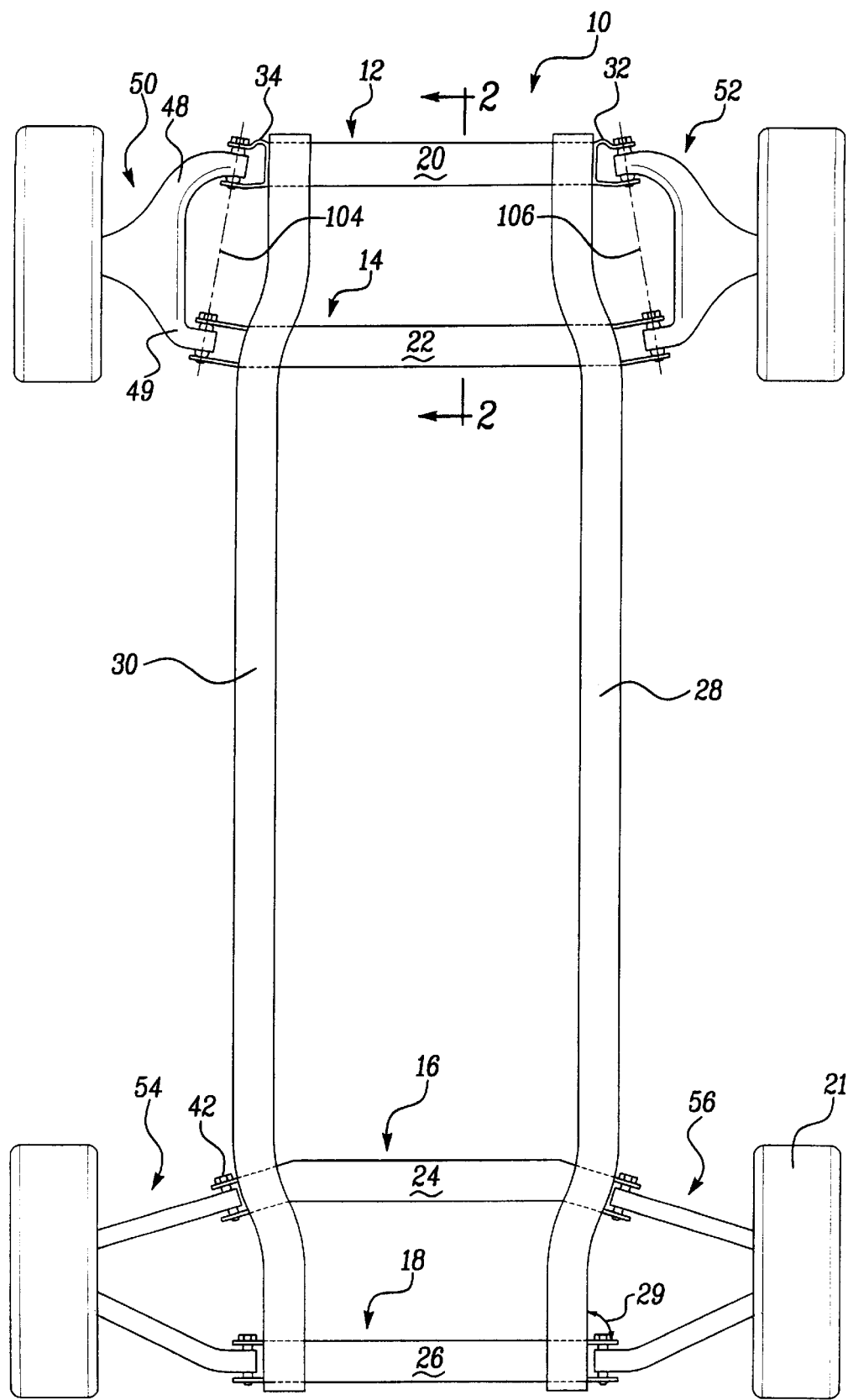
FIG. 1 is a plan view of a vehicle frame assembly selectively incorporating several wheel suspension attachment assemblies which are made in accordance with the teachings of the preferred embodiment of the invention.
Figure 2:
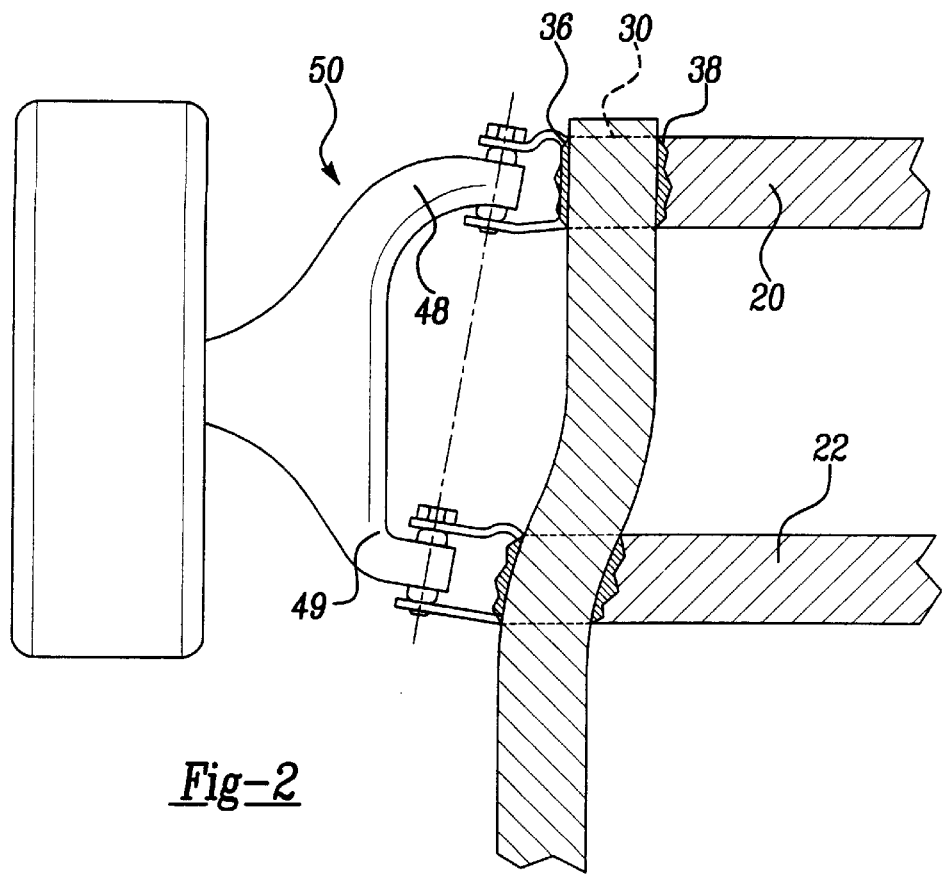
FIG. 2 is a sectional view of the vehicle frame assembly shown in FIG. 1 and taken along view line 2—2.

In yet another embodiment, as shown best in FIG. 1, members 20, 22 are substantially similar, each substantially and perpendicularly penetrating members 28, 30 while having respective protruding ends 32, 34 which are "flared away" from the members 24, 26 in order to allow the ends 32, 34 to conform to the structural variations and shape of respective structural frame members 28, 30. In this embodiment, ends 32, 34 of member 26 are substantially similar and perpendicularly penetrate respective members 28, 30. Further, in this embodiment, member 24 is bent before its substantially identical ends 32, 34 selectively penetrate and protrude from respective members 28, 30, thereby allowing the protruding ends 32, 34 of member 24 to conform to the structural variations and shape of the structural members 28, 30. Members 20–26 may have different shapes from those previously discussed and shown in order to be operatively placed upon and/or within various diverse types of structural frame members 28,30.

Welded connections, such as welded connections 36, 38, are selectively made between portions of members 30 and members 20–26 which are in respective operatively assembled contact engagement. Similar welded connections 36,38 are made to the portions of members 28 and members 20–26 which are in respective operatively assembled contact engagement. In this manner, the wheel suspension attachment members 20–26 are securely and operatively positioned within and/or upon the frame assembly 10.

Particularly, in one embodiment, ends 34 of members 20, 22 cooperate to allow the selective, movable, and respective attachment of control arms 48, 49 of wheel assembly 50 to structural frame member 30 of frame assembly 10. Ends 32 of members 20, 22 similarly cooperate to allow the selective, movable, and respective attachment of control arms 48, 49 of wheel assembly 52 to structural frame member 28 of frame assembly 10, while ends 34 of members 24, 26 cooperate to allow the selective, movable and respective attachment of control arms 48, 49 of wheel assembly 54 to structural frame member 30 of frame assembly 10. Ends 32 of members 24 and 26 cooperate to allow the selective, movable and respective attachment of wheel control arms 48, 49 of wheel assembly 56 to structural frame member 28 of frame assembly 10. In an alternate embodiment of the invention, each member 20–26 may be integrally formed within one of the members 28, 30 and selectively perforate the second of the members 28,30. Alternatively, each member 28, 30 may have and/or contain a respective and integrally formed portion of each member 20–26. Each of the integrally formed portions being selectively and respectively joined to form the assembly 10 shown in FIG. 1.

In a first non-limiting embodiment of the invention, as best shown in FIG. 3, each substantially hollow end portion 34 of at least one of the members 20–26 has a generally square or rectangular cross sectional area and movably and receivably contains a unique one of the generally conventional wheel control arms 48, 49 within a respectively formed reception cavity 35. Each portion 34 further includes a substantially identical and movable or selectively rotatable member 40, such as by way of example and without limitation a commercially available and conventional bushing and/or ball joint assembly, which is operatively positioned within the respectively received and/or contained unique control arm 48, 49.

Each end portion 34 further includes a perforating/penetrating bolt and/or fastener 42 which traverses through the respectively contained and operatively assembled members 40 and 48 or 49 and which is movably secured within each respective end portion 34 by a pair of substantially identical and commercially available/conventional nuts 44, 50. In this embodiment, each end portion 32 is substantially similar to the end portion 34 depicted within FIG. 3, and selectively and operably receives one of the members 48, 49 in a substantially identical manner as that previously described with respect to end portion 34. In this manner, as vehicle 19 is driven, each of the respectively and movable secured members 48, 49 is allowed to selectively rotate in the direction of arrow 46 along an arc of travel 70 having a length which is limited by the height of each of the respective openings 73. In one embodiment, each control arm 48,49 of each assembly 50–56 may be substantially similar. In another embodiment the control arms 48,49 may be selectively dissimilar (e.g., the control arms 48,49 of assemblies 54,56 differ in size and shape from control arms 48,49 of assemblies 50,52).

The selective and movable placement of a portion of each of the wheel control arms 48, 49, within one of the protruding hollow ends 32, 34, allows the received arms 48, 49 to rotationally and selectively move along respective travel arcs 70, as the generated wheel suspension forces are being dissipated, thereby substantially isolating the passenger compartment 100 from the vibrations induced by the traveling or movement of the wheels 21 upon the road. This arrangement further creates a relatively stiff or rigid attachment of the wheel suspension assemblies 50–56 to the structure frame members 28, 30, thereby allowing at least a portion of the generated wheel suspension assembly forces to be desirably absorbed by the respective protruding end portions 32, 34 of each of the control arm containing members 20–26, thereby reducing the amount of these forces which are actually applied to and/or communicated to the frame or structural members 28, 30, effective to reduce the amount of undesired structural frame deformation.

While each wheel assembly 50–56 may be selectively attached to the frame assembly 10 by use of an attachment assembly 20–26 of this invention, in actual use, only a selected few of these assemblies 50–56 may be attached in this manner. Moreover, in another non-limiting embodiment, of the invention, only one or a selected few of the control arms 48, 49 may be connected to the frame assembly 10 by use of members 20–26, in order to reduce costs or to comply with certain existing vehicle space constraints. Moreover, it should also be realized that while a complete or "unitized" frame assembly 10 is shown in FIG. 1, the invention applies equally well to those wheel assemblies 50–56 which are joined to a sub-frame assembly or unibody.

Referring now to FIG. 4, there is shown an end portion 34 which is made in accordance with a second embodiment of the invention and which includes and/or forms a substantially circular cross sectional area which allows the respectively received control arm 48, 49 to travel along an arc of travel 80 which is substantially longer than arc 70, thereby allowing for a greater amount of the suspension force to be movably dissipated before the control arm travel has been exhausted.

Further, in an alternate embodiment, at least one of the respective and opposed side surfaces 72, 74, of each portion 34, is indented or contains an impression or "relief" portion 99. The impression(s) 99 allow portions 34 to substantially conform to the width of movable member 40 and to frictionally engage the respective received movable member 40, thereby allowing various bushing and/or ball joint type assemblies to be selectively and severely employed along the contained moveable member axis 104 and 106 which, in the preferred embodiment of the invention, are substantially similar. Moreover, each portion 32 may be similarly and selectively configured in the manner shown within FIG. 4 and as has been previously delineated. Additionally, such indentations 99 may be similarly employed in the end portions 32, 34 shown in FIG. 3 and, for example, formed within member 20 of FIG. 1.

Referring now to FIG. 5, there is shown an end portion 34 made in accordance with the teachings of a third embodiment of the invention. Particularly, each end portion 34, in this embodiment, includes respective and substantially identical "notched" or selectively opened top and bottom surfaces 76, 78 which cooperatively allow the retained member 48,49 to travel within a generally "C" shaped travel path and along a travel arc 90.

In one non-limiting embodiment, arc 90 is substantially longer than those respective travel arcs 70, 80 provided by the previously delineated embodiments, thereby allowing a greater amount of the suspension force to be rotatably dissipated before the control or travel has been exhausted, thereby further isolating the passenger compartment 100 from the "travel induced/generated" vibrations and further stiffening the wheel assemblies 50–56 to the frame assembly 10. Each end portion 32 may be similarly and selectively configured as shown in FIG. 5 and as previously delineated.

It is to be understood that the invention is not limited to the exact construction and/or method which has been illustrated and/or discussed above, but that various changes and/or modifications may be made without departing from the spirit and/or the scope of the invention.

What is claimed is:

1. An attachment assembly for use in combination with a vehicle having at least one wheel assembly and at least one frame member, the attachment assembly comprising:

a member having a hollow end portion which perforates and protrudes from the at least one frame member and which contains a portion of the at least one wheel assembly; and a movable member which movably resides within said protruding hollow end portion and which is attached to said contained portion of said at least one wheel assembly, thereby cooperating with said member to rigidly attach the at least one wheel assembly to the at least one frame member.

2. The attachment assembly of claim 1 wherein said movable member comprises a ball joint.

3. The attachment assembly of claim 1 wherein said movable member comprises a bushing.

4. The attachment assembly of claim 1 wherein said portion of said wheel assembly comprises a control arm.

5. An attachment assembly for use in combination with a vehicle having at least one wheel assembly and at least one frame member, the attachment assembly comprising:

a movable member having a certain width and being movably coupled to a portion of said at least one wheel assembly; and a member having a substantially circular cross sectional area and perforating and protruding from said at least one frame member, said member further having a hollow end portion which selectively receives said movable member and said portion of said at least one wheel assembly, said end portion further having a pair of indentations which cooperatively conform to said certain width of said movable portion and which cooperate to frictionally secure said movable member within said hollow end portion while allowing said received portion of said at least one wheel assembly to selectively move within said member, effective to attach the at least one wheel assembly to the at least one frame member.

6. An attachment assembly for use in combination with a vehicle having at least one wheel assembly and at least one structural member, the attachment assembly comprising:

a member having an end portion which perforates and protrudes from the at least one structural member and which provides a generally arcuately shaped travel path; and a movable member which movably resides within said end portion and which is attached to said at least one wheel assembly, said movable member being effective to selectively move said at least one wheel assembly within said generally arcuately shaped travel path, thereby movably attaching the at least one wheel assembly to said at least one frame member.

7. The attachment assembly of claim 6 wherein said arcuate travel path is substantially "C" shaped.

8. The attachment assembly of claim 6 wherein said wheel assembly comprises at least one control arm.

\* \* \* \* \*